July 4, 1939.  G. COLLINS  2,164,576
TESTING OF LENSES OR OTHER IMAGE PRODUCING OPTICAL DEVICES
Filed Feb. 2, 1937
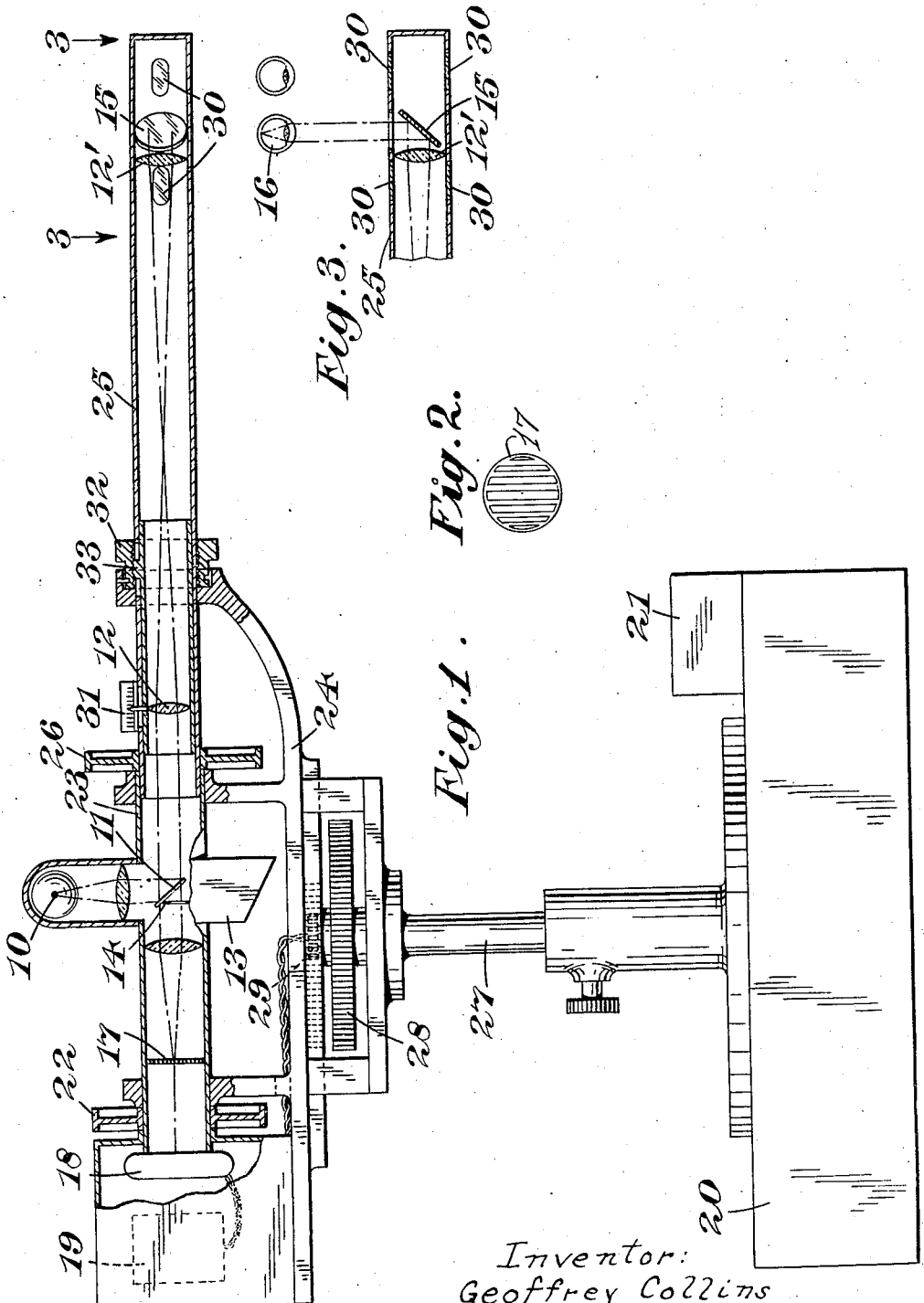
Inventor:
Geoffrey Collins
By Young, Emery & Thompson
Attorneys Patented July 4, 1939

2,164,576

UNITED STATES PATENT OFFICE 2,164,576

TESTING OF LENSES OR OTHER IMAGE PRODUCING OPTICAL DEVICES

Geoffrey Collins, Weybridge, England

Application February 2, 1937, Serial No. 123,713
In Great Britain October 10, 1936

4 Claims. (Cl. 88—56)

This invention consists in improvements in or relating to the testing of lenses or other image producing optical devices (e. g. mirrors) which are hereinafter referred to as "lenses". The invention has for an object to provide a device for testing focal characteristics (e. g. the focal length or astigmatism) of lenses and is particularly, but not exclusively, concerned with the investigation of the eye including the testing of its lens system.

The invention consists in a device for testing focal characteristics of lenses comprising means for directing a beam of light through or onto the lens to be tested to cause it to direct on to a light sensitive cell at light beam which depends for its cross-sectional area and/or intensity of illumination upon the lens, a mask in the path of the light between the lens and the cell and indicating means responsive to the amount of the illumination of the cell, the mask being arranged to cut off from the cell different amounts of the light according to the degree of focus of the beam by the lens and thereby to cause variations in the response of the indicating means.

Preferably means are provided for changing the angle at which the beam strikes the lens during the test (e. g. by movement or apparent movement of the light source)

In one form of the device means are provided for moving the beam focussed (or partly focussed) by the lens in a direction across the mask and the mask has a plurality of apertures extending in the direction of the movement of the beam and over which the beam passes during its movement, the apertures or the parts of the mask between the apertures, or both, being so related to the size of the beam at the mask that the degree of variations in intensity of illumination of the cell, as the beam moves over the mask and apertures, depends upon the degree of focus of the beam by the lens. In this form of the device the indicating means are arranged to respond to the degree of variation of the intensity of illumination of the cell. Preferably the beam is reciprocated over the lens, for example, by means of a vibrating mirror. The light source may be in the form of a line (e. g. a lamp having a single filament or an illuminated slit) and the mask be constituted by a grid of which the lines and spaces have a width approximately equal to the width of the light source and are arranged parallel to the image of the light source at the mask.

Means may be provided for effecting the test over different meridians of the lens to be tested. For example when the beam is stationary a light source of non-circular form may be employed and the light source and mask be rotated, mechanically or optically, in relation to the lens. Alternatively, when the light source is being moved during the test the direction of movement may be rotated, mechanically or optically, in relation to the lens. Instead of rotating the light source and mask or the direction of movement of the light source the lens itself may be rotated.

A control lens system may be incorporated in the device and be so constructed and arranged that in combination with the lens to be tested it brings the beam to a suitable degree of focus at the mask, the control lens system being adjustable as to focus to compensate for variations in the lens to be tested and preferably calibrated to indicate by the adjustment required any variation of the lens from a standard.

When the device is to be used for testing a lens such as that of the eye, in which the beam passes through the lens on to a reflecting surface (e. g. the fundus of the eye) and it is not possible, or convenient, to pass it directly on to the cell the reflecting surface is employed to reflect the image of the light source produced by the lens back through the lens and a semi-transparent mirror placed at an angle to the beam (or a like beam separating device) is provided in the beam for separating, in part, the incident beam and the reflected beam, the reflected beam being directed on to the light sensitive cell and, by reason of the mask, reaching it in amounts varying in accordance with the degree of focus of the lens producing the image.

When the device is to be used for testing the lens system of the eye it is preferred to employ a beam of infra-red light, which will be substantially invisible to the patient, and for this purpose a suitable filter may be provided in the path of the light beam.

A specific embodiment of the invention will now be described by way of example and with reference to the accompanying diagrammatic drawing, in which Figure 1 is a cross-section through one form of apparatus suitable for use in testing the eye;

Figure 2 is a detail view of the grid used in the apparatus; and

Figure 3 is a plan, in section, of the portion 3—3 in the apparatus shown in Figure 1.

The light source 10 is an electric lamp having a single straight filament arranged horizontally, the light being directed on to a semi-transparent mirror 11 (which may be a plain glass plate) lying in a plane at 45° to the vertical. The mirror reflects an image of the filament horizontally into a lens system 12, 12' and an electro-magnet operated by alternating current at standard frequency is provided inside the casing 13 and connected to the mirror as shown diagrammatically at 14, for effecting oscillation of the mirror through a small angle about a horizontal axis lying in the plane of the mirror and parallel to the length of the filament, so that the image is given a small vertical up and down movement. The light leaving the lens system 12, 12' is reflected by a second mirror 15 (which may also be of a semi-transparent character with a view to rendering it less obvious to the patient) lying in a vertical plane at 45° to the axis of the lens system. This mirror reflects the beam into the patient's eye indicated at 16. Located on the optical axis of the lens system and on the other side of the first semi-transparent mirror 11 from the lens system is a grid 17 (shown in detail in Fig. 2) composed of horizontal bars and spaces the plane of the grid being perpendicular to the optical axis of the lens system and the grid being spaced apart from the mirror by an amount equal to the distance between the filament of the lamp and the mirror or, as in the device shown, associated with suitably proportioned lenses so that the reflected image later described is in focus at the grid. A light sensitive cell 18 is positioned behind the grid and is connected through a suitable pre-amplifier 19 and a main amplifier contained in the base 20 to an electrical indicating device such as a loudspeaker or an alternating current meter or a valve voltmeter 21. The amplifying device includes a filter for eliminating direct current.

The lens system 12, 12' which is adjustable as to its focus is arranged to produce an image of the lamp filament on the fundus of the patient's eye, and may include a reversing prism or other image rotating optical device. This device, which may consist of a known form of prism, is arranged to produce on rotation a rotation of the image in the patient's eye for the purpose of testing the lens system of the eye over different meridians. Preferably, however, the image is rotated by bodily rotation of the lamp 10, mirror 11, grid 17 and associated parts about the axis of the lens system 12, 12'. This rotation may, in the device shown, be effected by means of the handwheel 22 which is arranged to rotate the tube 23 in bearings on the bracket 24. The tube 25 is also arranged for rotation about its axis, by means of the handwheel 26 for the purpose of orienting the mirror 15 in relation to the patient's eye.

Further the bracket 24 carrying with it the optical portion of the device may be adjusted horizontally in relation to the supporting stand 27 so that the mirror 15 may direct the beam into either of the patient's eyes. This movement may be effected by means of the hand-wheel 28 which has a pinion 29 engaging with a rack formed on the bracket 24. Two apertures 30 are provided in the tube 25 to either side of the mirror 15 and these apertures are covered with tinted material having somewhat the same appearance to the patient as the mirror 15 so that when the patient is looking into the device and invisible light is used to effect the test the device appears substantially the same to both of his eyes.

The operation of the device is that light from the filament 10 falls on the first semi-transparent mirror 11 and a portion of the light is reflected thereby through the lens system 12, 12' (and the reversing prism if provided) on to the second semi-transparent mirror 15 which reflects it into the patient's eye 16. The lens system, by movement of the lens 12 over a calibrated scale 31, by means of the handwheel 32 in screw-threaded engagement with the sleeve 33 carrying the lens, can be adjusted so that the system in combination with the lens of the eye produces a sharp image of the filament on the fundus of the eye (see Figure 3) whatever may be the condition of the patient's sight. This image due to the vibration of the first semi-transparent mirror 11 moves up and down vertically over the fundus and is reflected back therefrom through the lens system, the fundus being the first reflecting surface in the device from which such a reflection can occur. A portion of the reflected beam passes through the first semi-transparent mirror 11 on to the grid 17 and is brought to a focus to produce an image of the light source at the plane of the grid. The bars and spaces of the grid have each the same width as the barlike image and as the image moves vertically over the grid the light will alternately pass through the spaces of the grid on to the light sensitive cell 18 and be wholly absorbed by the bars of the grid. These intermittent pulses of light cause an alternating current to be generated in the circuit associated with the light sensitive cell which is amplified and gives a signal in the loudspeaker or a reading on the meter or other similar indicating device.

If the image formed on the fundus of the patient's eye is out of focus then the reflected image formed at the grid will also be out of focus and will have a width greater than that of the bars and spaces of the grid so that as the image moves over the grid the light will not be completely cut off from the light sensitive device and the signal or indication in the indicating device will have a lower value than is the case if the image is in focus. The condition of best focus on the fundus can therefore be determined by adjustment of the lens 12 until the signal or other indication reaches a maximum and any error in the lens system of the eye may be estimated from the amount which the lens system must be adjusted from a standard position. This estimation can be used for determining the suitable corrective lens for the patient.

By rotation of the light beam by means of the handwheel 22 or by means of an image rotating prism the image may be caused to be produced by different meridians of the patient's eye and in this manner estimations can be made of astigmatism and of the necessary corrective lenses.

It is to be understood that the invention is not restricted to the precise constructional details set forth in the above example. Thus, some or all of the amplification of the signal may be effected by an electron multiplier. Again, an infra-red filter may be included between the light source and the first semi-transparent mirror 11 and when such a filter is used then the second mirror 15 may be made of glass, such as that known as Gold Reflexotex which has the property of being largely transparent to visible light but is a good reflector of infra-red light. The scale 31 over which the lens system is adjusted may be calibrated to read directly in diopters the power, in any meridian, of the corrective lens required by the patient.

Again, when the device is to be used for testing an ordinary lens it is not necessary that the image be reflected back through the lens system and the device may be so arranged that the lens to be tested focuses an image directly on to the grid.

It is an advantage of the device described above when applied to the testing of the eye that adverse effects on the results due to reflection from the front of the eye (or cornea) are reduced or eliminated. If the image is in, or nearly in, focus on the fundus of the eye, then it cannot be in focus on the front of the eye and the reflection therefrom will be a substantially constant amount as the beam moves during the test and will therefore not of itself cause any signal to be given in the loudspeaker or other indicating device since a signal can only be generated by variations in the beam reaching the light sensitive device.

I claim:

1. Apparatus for testing focal characteristics of image focussing optical devices comprising a light-sensitive cell, means for causing the device to be tested to direct a beam of light on to the cell, a mask in the path of the light beam between the device and the cell, indicating means responsive to the amount of illumination of the cell and means for moving the beam directed by the device in a direction across the mask, the mask having a plurality of apertures extending in the direction of movement of the beam and over which the beam passes during its movement and the apertures being so arranged that, as the beam passes over the apertures, they cause variations in the intensity of illumination of the cell by the light passing through the apertures, and hence in the response thereto of the indicating device depending upon the degree of focus of the beam by the device.

2. Apparatus for testing focal characteristics of image focussing devices comprising a light source in the form of a line, a light-sensitive cell, a mask in the optical path between the device to be tested and the cell, means for causing the device to direct an image of the light source on to the mask, indicating means responsive to the amount of illumination of the cell and means for moving the image of the light source on the mask across the mask, the mask being in the form of a grid of which the lines and spaces are substantially parallel to the image and are so related to the size of the image that the degree of variations in intensity of illumination of the cell and hence the response of the indicating means as the beam moves over the mask and apertures depends upon the degree of focus of the image by the device.

3. Apparatus for testing focal characteristics of an image-forming optical device associated with a reflecting surface comprising a light-sensitive cell, means for causing the device to be tested to direct a beam of light on to the reflecting surface and to cause that surface to reflect the beam on to the cell, a mask in the path of the light beam between the device and the cell, indicating means responsive to the amount of illumination of the cell and means for moving the reflected beam in a direction across the mask, the mask having a plurality of apertures extending in the direction of movement of the beam and over which the beam passes during its movement and the apertures being so arranged that, as the beam passes over the apertures, they cause variations in the intensity of illumination of the cell by the light passing through the apertures, and hence in the response thereto of the indicating device depending upon the degree of focus of the beam by the device.

4. Apparatus for testing focal characteristics of an image-forming optical device associated with a reflecting surface comprising a light-sensitive cell, means for causing the device to be tested to direct a beam of light from a light source in the form of a line on to the reflecting surface and to cause that surface to reflect the beam back through the device, means for separating at least in part the incident and reflected beams and to direct the separated reflected beam on to the cell, a mask in the path of the reflected beam, a vibrating reflector in the light path between the light source and the mask arranged to cause movement of the beam over the mask and indicating means responsive to the amount of illumination of the cell, the mask having a plurality of apertures of linear form over which the beam passes during its movement, the apertures being so arranged that they cause variations in the intensity of illumination of the cell, and hence in the response of the indicating means, as the beam moves over the mask, in amounts depending upon the size of the beam at the mask.

GEOFFREY COLLINS.